United States Patent

[11] 3,617,209

| [72] | Inventors | Joachim Massonne<br>Hannover;<br>Heinrich Paucksch, Langenhagen; Heinz<br>Wiele, Hannover, all of Germany |
|------|-----------|---|
| [21] | Appl. No. | 855,628 |
| [22] | Filed     | Sept. 5, 1969 |
| [45] | Patented  | Nov. 2, 1971 |
| [73] | Assignee  | Kali-Chemie Aktiengesellschaft<br>Hannover, Germany |
| [32] | Priority  | Sept. 5, 1968 |
| [33] |           | Germany |
| [31] |           | P 17 92 465.1 |

[54] PROCESS FOR THE REMOVAL OF HALOGEN-CONTAINING METHANE OR ETHANE DERIVATIVES FROM HYDROCHLORIC ACID
1 Claim, 1 Drawing Fig.

[52] U.S. Cl. ................................................... 23/154,
   55/71, 202/46, 202/67, 23/310, 23/312
[51] Int. Cl. ...................................................... C01b 7/08
[50] Field of Search ............................................ 23/154,
   310, 312; 55/71

[56] References Cited
UNITED STATES PATENTS

| 1,758,351 | 5/1930  | Campbell ..................... | 23/154 X |
| 2,436,432 | 2/1948  | Hunter ......................... | 23/154   |
| 2,615,791 | 10/1952 | Raley ........................... | 23/154   |
| 3,140,244 | 7/1964  | Simek et al. .................. | 23/154 X |
| 3,165,453 | 1/1965  | Sutter........................... | 23/154 X |
| 3,192,128 | 6/1965  | Brandmair et al. ............ | 23/154 X |
| 3,260,059 | 7/1966  | Rosenberg et al. ........... | 23/154 X |
| 3,347,021 | 10/1967 | Hutton ......................... | 55/71    |

*Primary Examiner*—Edward Stern
*Attorney*—Christen, Sabol & O'Brien

ABSTRACT: A process for the removal of small quantities of fluorine and/or chlorine-containing methane or ethane derivatives from hydrochloric acid by passing air through said acid at a temperature between about 0° and 50° C.; preferably the hydrochloric acid and air are contacted countercurrently in a packed column.

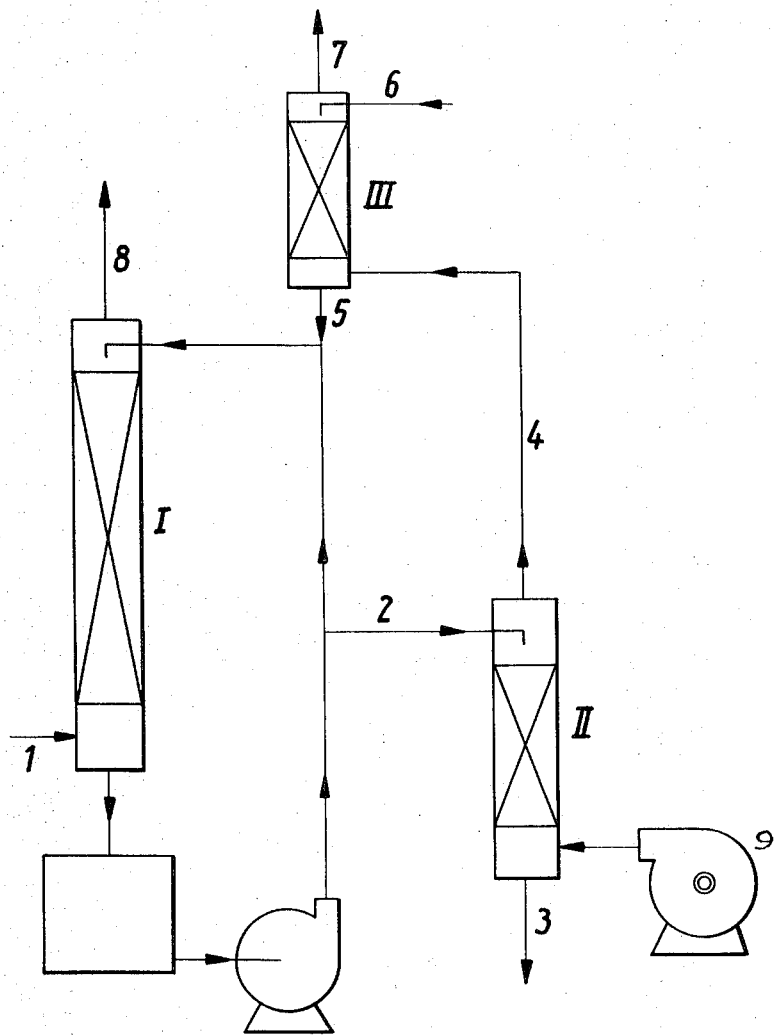

PROCESS FOR THE REMOVAL OF HALOGEN-CONTAINING METHANE OR ETHANE DERIVATIVES FROM HYDROCHLORIC ACID

The present invention relates to a process for the removal of small quantities of fluorine and/or chlorine containing methane or ethane derivatives from hydrochloric acid.

Hydrochloric acid with a small content of fluorine and/or chlorine-containing methane or ethane compounds is obtained for example during conversion of the corresponding chlorinated hydrocarbons with hydrogen fluoride in the presence of catalysts such as antimony pentafluoride, mixtures of antimony trifluoride and antimony pentafluoride etc., at elevated temperatures. In that process methane or ethane derivatives can also serve as starting materials, in which the chlorine atoms have already partially been replaced by fluorine. In the conversion, and corresponding to the molar quantities of hydrogen fluoride used, an exchange of chlorine for fluorine takes place in the halogenated hydrocarbon and hydrogen chloride is formed in the corresponding molar ratio. The conversions take place for example in accordance with the following reaction equations:

1. $2CCl_4 + 3HF \rightarrow CF_2Cl_2 + CFCl_3 + 3HCl$
2. $CHCl_3 + 2HF \rightarrow CHF_2Cl + 2HCl$
3. $2C_2Cl_6 + 7HF \rightarrow C_2F_3Cl_3 + C_2F_4Cl_2 + 7HCl$ To separate hydrogen chloride from the gaseous mixture leaving the reactor, customarily the whole of the reaction gases are passed through water. At the same time, hydrogen chloride is absorbed and there develops an aqueous hydrochloric acid solution whose content of hydrogen chloride, generally speaking, lies between 15 percent and 30 percent by weight.

This hydrochloric acid represents a valuable byproduct. One disadvantage, however, is that the hydrochloric acid contains the remaining reaction components in a dissolved state, corresponding to the solubility of these components in an aqueous hydrochloric acid solution and to their concentrations in the gaseous mixture. Thus, for example, in the fluoridization of tetrachloromethane, the reaction components include $CF_2Cl_2$, $CFCl_3$ and nonconverted tetrachloromethane. Since the solubilities of these organic compounds in aqueous hydrochloric acid solutions are relatively low, it is true that only small quantities of these substances, generally speaking less than 1,000 p.p.m. are dissolved, but their presence can nevertheless make the hydrochloric acid useless for many purposes.

One area of application for hydrochloric acid is, for example, in the regeneration of ion exchange resins in complete desalinification plants for purification of boiler feed water. When a hydrochloric acid containing a small quantity of fluorine and/or chlorine hydrocarbons is used for the regeneration, the organic compounds present are absorbed by the ion exchange resins and are delivered during the subsequent desalinification process to the desalinified water. The conditions prevailing in the steam boiler favor a hydrolysis of the halogen-containing hydrocarbons and, for example, a formation of hydrogen fluorine and/or hydrogen chlorine occurs corresponding to the following equations:

4. $CFCl_3 + 2H_2O \rightarrow CO_2 + HF + 3HCl$
5. $CCl_4 + 2H_2O \rightarrow CO_2 + 4HCl$ As a consequence of the presence of hydrogen halides in the boiler feed water a corrosion of the boiler material may occur. It is therefore necessary to free the hydrochloric acid from the dissolved hydrocarbon halides prior to use for this particular purpose as well as in many other fields of application.

It is therefore an object of the present invention to provide a novel process for the removal of small quantities of halogen-containing methane or ethane derivatives from hydrochloric acid containing said derivatives.

Other objects and advantages will become apparent from a consideration of the following specification and claims.

For a more comprehensive disclosure of the nature, objects and advantages of the invention, reference is made to the following detailed description and to the accompanying drawing, which diagrammatically shows the process of the present invention for the purification of hydrochloric acid.

In accordance with the present invention, such fluorine and/or chlorine containing derivatives of methane or ethane are removed from the hydrochloric acid by treating the hydrochloric acid contaminated with these compounds with air at a temperature not above 50° C. Preferably the air treatment is carried out at room temperature since the HCl partial pressure increases with increasing temperature and, consequently, the waste gas will contain hydrogen chloride gas at an increased quantity. The temperature may be as low as about 0° C. In the broadest embodiment of the invention, air is blown through the hydrochloric acid solution by way of a suitable device, for example, by means of an input pipe. An improvement of the distribution of the air bubbles can be achieved through use of conventional means, for example, through use of input pipes provided with fine grained filters or nozzles, of stirrers or similar devices. A particularly good purification effect will be achieved if the air and the hydrochloric acid are guided in a countercurrent manner in a packed column. Through the intensive mixing of the hydrochloric acid with air the evaporation of the relatively volatile halogenated hydrocarbons and thus their expulsion will be furthered to such an extent, that even small quantities thereof are carried along forcefully by the current of air so that a practically pure hydrochloric acid will result.

Since the air is charged with small quantities of hydrocarbons in the hydrochloric acid to be purified depending on the hydrochloric acid concentration and the treatment temperature, it may be necessary to wash the air subsequently with water or with alkaline-reacting solutions, such as alkali liquor, prior to its being fed into the atmosphere. Small quantities of hydrochloric acid can be purified intermittently, the purification of fairly large quantities for practical purposes being carried out continuously.

Referring now more particularly to the drawing for a detailed description of a preferred mode of the invention, there is shown a process diagram, according to which the removal of volatile hydrocarbon halide substances from hydrochloric acid is accomplished in a simple manner with the absorption apparatus of a production plant for fluorine, chlorine, methane or ethane. The production gas as in this case is fed through line 1 to washer I, i.e., washed with water, and drawn off through line 8. The aqueous HCl solution which develops can be recirculated for such time until the hydrochloric acid has the desire concentration. The aqueous hydrochloric acid is drawn off through pipe 2 and is fed to the purification column II which is filled with packing in the conventional manner. Air is fed to the hydrochloric acid by means of compressor 9. The hydrochloric acid purified of the hydrocarbon halides is drawn off through pipe 3. If necessary, the hydrochloric acid obtained in this manner can be subjected to a still additional purification, for example to a treatment for separating small quantities of hydrogen fluoride by passing the hydrochloric acid into contact with a compound containing or forming a silicic acid and through separation of the undissolved portion (not disclosed in the drawing) as described in German Pat. No. 1,241,422. The hydrochloric acid obtained in such a manner has such a degree of purification that it is capable of being used without limitation.

The air current charged with HCl and the volatile organic substances is fed via 4 to the water absorption column III in which the HCl is washed with water fed through pipe 6. The HCl containing water flows off through pipe 5 and is fed to the HCl washer I. It is fed to the washer in an amount equal to that of the hydrochloric acid removed through line 2. The air, free of HCl, is conducted into the atmosphere through pipe 7.

The following are specific examples of preferred embodiments of the present invention.

EXAMPLE 1

Into 50 liters of 30 percent hydrochloric acid with a content of 42 parts per million by weight of fluorinated and/or chlorinated methane derivatives which had been obtained through washing of the reaction gases obtained during the conversion of tetrachloromethane and hydrogen fluoride, 500 liters of air were introduced by means of an input pipe which had been provided with a gas distribution frit. After the air treatment, the content of the methane compounds had dropped to 17 p.p.m. by weight. After passing an additional 500 liters of air through the hydrochloric acid, only 8 p.p.m. by weight of the halogenated methane compounds remained.

EXAMPLE 2

Thirty percent hydrochloric acid containing 56 p.p.m. by weight of fluorinated and chlorinated methanes, which had been obtained through washing of the reaction gases obtained during the conversion of tetrachloromethane with hydrogen fluoride, was conducted through a packed column at a speed of 1 liter/minute. 10 liters of air per minute were introduced countercurrently into the column. The hydrochloric acid leaving the washing column contained less than 1 p.p.m. by weight of halogenated methane compounds.

What is claimed is:

1. In a continuous process for the removal of small quantities of halogen-containing methane and ethane derivatives from aqueous hydrochloric acid obtained when washing a hydrogen chloride-containing gas mixture resulting from the production of fluorochloromethanes and fluorochloroethanes, said halogen being selected from the group consisting of fluorine, chlorine and a mixture thereof, by blowing air through the hydrochloric acid countercurrently in a first absorption column and at a temperature between 0°–50° C., and thereafter recovering a purified aqueous hydrochloric acid solution essentially free of any of the halogen-containing methane and ethane derivatives, the improvement which comprises contacting the air emitted from said first absorption column and admixed with volatilized hydrogen chloride and said halogen-containing methane and ethane derivatives with water in a second absorption column, and using the resulting dilute hydrochloric acid solution thus obtained which also contained halogen-containing methane and ethane derivatives to wash said hydrogen chloride-containing gas mixture by conducting said acid solution countercurrent to said gas mixture and in an amount equivalent to the amount of aqueous hydrochloric acid recovered.

* * * * *